Figure 1:
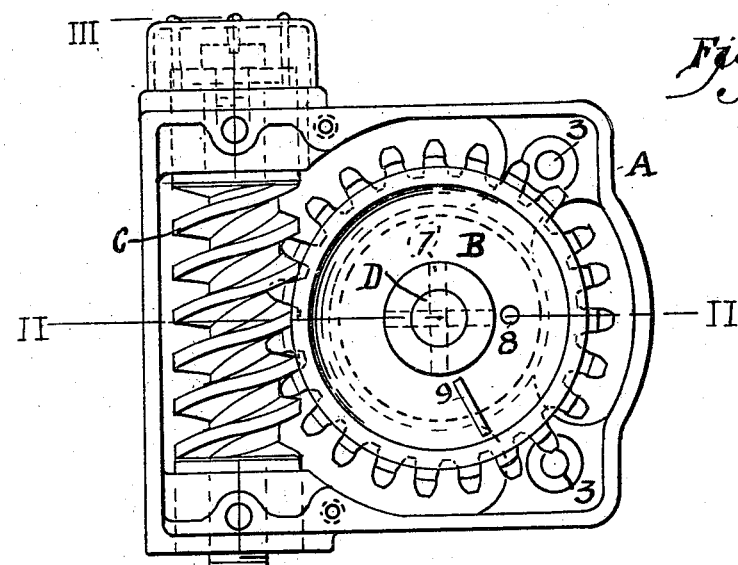

W. TRINKS.
GEAR OR WORM WHEEL.
APPLICATION FILED AUG. 1, 1916.

1,230,631.

Patented June 19, 1917.

WITNESS

INVENTOR
Willibald Trinks,
by Edward A. Lawrence
his attorney.

UNITED STATES PATENT OFFICE.

WILLIBALD TRINKS, OF PITTSBURGH, PENNSYLVANIA, ASSIGNOR, BY MESNE ASSIGNMENTS, TO NATIONAL BRUSH WASHING MACHINE COMPANY, OF PITTSBURGH, PENNSYLVANIA, A CORPORATION OF DELAWARE.

GEAR OR WORM-WHEEL.

1,230,631.   Specification of Letters Patent.   Patented June 19, 1917.

Application filed August 1, 1916.   Serial No. 112,488.

*To all whom it may concern:*

Be it known that I, WILLIBALD TRINKS, a citizen of the United States, and residing in the city of Pittsburgh, in the county of Allegheny and State of Pennsylvania, have invented or discovered new and useful Improvements in Gears or Worm-Wheels; of which the following is a specification.

My invention comprises new and useful improvements in gears and worm wheels, and the object in view is to enable the same to successfully carry high pressures.

In order to successfully carry high pressures on the teeth of gears and worm wheels, the axes of the intermeshing members must be held immovable in their relative positions. Thus the working surfaces of a worm and worm wheel are curved in all directions so that excessive tooth pressures are produced when the relative positions of worm and wheel are changed for even a seemingly insignificant amount.

This consideration becomes even more important if there be additional forces acting to displace either the worm or worm wheel, such, for instance, as a force acting in the direction of the axis of the worm wheel.

My invention provides for equipping a gear or worm wheel with wide bearing surfaces which take all of the forces directly and do not transmit the same by means of shafts, &c., the fastening of which always involves inaccuracies.

Thus the inclination of the teeth of the worm produces a thrust at an angle to the axis of the worm wheel. This thrust I take up by means of a cylindrical bearing surface integral with the worm wheel and concentric with its axis. This bearing surface is of sufficient diameter and length to avoid wear, and the elimination of wear insures the maintenance of the worm wheel in its proper position. To avoid binding or tilting moments on the cylindrical bearing, I draw the same well into the wheel, at least to its center line.

Again, in practically every use of worm wheels, the latter are subjected to a predominant axial force. If this force is taken up by the shaft at some distance from the wheel, elastic deformations and changes in temperature change the position of the worm wheel and throw the teeth out of proper location.

To overcome this difficulty, I prefer to take up the axial forces directly at the worm wheel by means of an annular flat bearing surface which may be formed on the web of the wheel between the hub and the toothed perimeter. This surface I make as large as the worm wheel will permit for the purpose of reducing the unit pressure on the supporting area and of practically eliminating wear.

Figure 2:
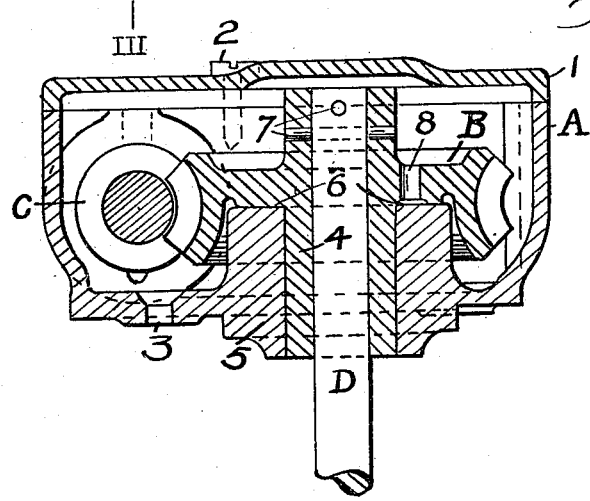

In the accompanying drawings, which are intended merely to illustrate the principles of my invention as applied to a worm wheel without limiting the scope thereof to the same, Figure 1 is a plan view of a worm drive box, with the lid removed, containing a worm meshing with a worm wheel embodying my invention, and Fig. 2 is a section taken along the line II—II in Fig. 1.

The following is a detailed description of the drawings.

A is the box, in which the worm and worm wheel are contained and journaled, provided with a removable lid 1 secured in place, as by screws 2. 3 represents bolt holes by means of which the box may be mounted on a piece of machinery or other support.

B is a worm wheel in mesh with a worm C. The hub of the wheel B is extended to form a relatively long cylindrical bearing 4 which is journaled in the cylindrical bearing 5 integral with the bottom of the box A. The inner end of the bearing 5 is in a plane at right angles to the axis of said bearing, and bears against a flat bearing surface 6 formed on the web of the wheel B. The cylindrical bearing surface 4 of the wheel is led in so that the flat bearing surface 6 is at least at the center line of the wheel. The other end of the wheel hub is extended so that cross pins 7 may be used to pin the wheel to the driven shaft D which is inserted through the hub of the wheel. An oil port 8 is drilled down through the web of the wheel B and enlarged or recessed, as shown, at its lower or inner end to feed lubricant to the bearing surfaces 4 and 6.

It is evident that the wheel B will thus be maintained in its proper position no matter whether the shaft D fits snugly or loosely in the hub of wheel B, and that both the axial and angular forces will be taken up and the wear minimized. It is also evident that the bearing surfaces of the wheel are thoroughly lubricated.

To stimulate the circulation of the lubricant to and over the various bearing surfaces of the worm and worm wheel, I provide a radial fin or scraper 9 on the upper or outer face of the wheel B which moves with the wheel in the body of lubricant contained in the box A.

What I desire to claim is:

1. A gear or worm wheel provided with a flat bearing surface at right angles to its axis and substantially in the line of the center of the teeth for axial forces, and a cylindrical bearing surface for angular forces, substantially as described.

2. In a gear or worm wheel mounting, the combination of a fixed bearing provided with a flat bearing surface and an annular interior bearing surface whose axis is at right angles to said flat bearing surface, and a toothed wheel provided with a flat bearing surface substantially in line with the center of the teeth, engaging said first named flat bearing surface, for axial forces, and a hub having an exterior cylindrical bearing surface journaled in said annular interior bearing surface, for angular forces, substantially as described.

Signed at Pittsburgh, Penna., this 26th day of June 1916.

WILLIBALD TRINKS.

Copies of this patent may be obtained for five cents each, by addressing the "Commissioner of Patents, Washington, D. C."